US007653489B2

(12) United States Patent
Lakhani et al.

(10) Patent No.: US 7,653,489 B2
(45) Date of Patent: Jan. 26, 2010

(54) METHOD OF MEASURING GAS FLOW

(75) Inventors: Iqbal Lakhani, Sherwood Park (CA); Tokunosuke Ito, Calgary (CA); Brian Zerb, Edmonton (CA); Long Zhao, Edmonton (CA); Robert Do, Edmonton (CA)

(73) Assignee: zed.i solutions (Canada) inc., Calgary, Alberta (CA)

( * ) Notice: Subject to any disclaimer, the term of this patent is extended or adjusted under 35 U.S.C. 154(b) by 0 days.

(21) Appl. No.: 11/807,815

(22) Filed: May 30, 2007

(65) Prior Publication Data

US 2008/0300792 A1  Dec. 4, 2008

(51) Int. Cl.
*G01N 11/04* (2006.01)
(52) U.S. Cl. .................... 702/12; 702/6; 702/9; 702/13
(58) Field of Classification Search ................... 702/12, 702/13, 27, 100, 130, 182, 183; 73/861.04; 95/1, 164; 455/423
See application file for complete search history.

(56) References Cited

U.S. PATENT DOCUMENTS

| | | | | |
|---|---|---|---|---|
| 6,139,605 | A * | 10/2000 | Carnell et al. | .................. 95/164 |
| 6,382,032 | B1 * | 5/2002 | Hatton et al. | ............. 73/861.04 |
| 7,139,564 | B2 * | 11/2006 | Hebert | ........................ 455/423 |
| 2007/0006727 | A1 * | 1/2007 | Gysling | ........................... 95/1 |

FOREIGN PATENT DOCUMENTS

GB    2 411 476 A    8/2005

OTHER PUBLICATIONS

ISA Search Report, Apr. 27, 2009, zed.i solutions (Canada) Inc.
Atkinson D I et al: "High-accuracy wet-gas multiphase well testing and production metering" SPE Journal, Society of Plastics Engineers Inc. Greenwich, US, vol. 11, No. 2, Jun. 1, 2006, pp. 199-205, XP009115015 the whole document.
Atkinson D I et al: "High-accuracy wet-gas multiphase well testing and production metering" SPE Annual Technical Conference and Exhibition, XX, XX, Sep. 26, 2004, pp. 1-9, XP009115014 the whole document.

* cited by examiner

*Primary Examiner*—Eliseo Ramos Feliciano
*Assistant Examiner*—Felix E Suarez
(74) *Attorney, Agent, or Firm*—Jones Walker

(57) ABSTRACT

A method of measuring a dry gas flow from hydrocarbon wells. The hydrocarbon wells produce a stream which contains liquids and natural gas. The method comprises providing an differential flow measurement device (orifice) located at a well site containing the hydrocarbon wells. The method further includes testing the stream for gas composition and physical characteristics. Additionally, the method comprises measuring a static temperature (T) of the stream, measuring a static pressure (Ps), and measuring a pressure differential (dP) in the differential flow measurement device (orifice). The method includes computing the liquid-gas ratio (LGR) of the stream, computing the wet gas flow rate (Qw) of the stream, computing a first dry gas flow rate (Qd1) and a second dry gas flow rate and utilizing a iterative process to correct and obtain the dry gas flow rate. The data may be transmitted to another location.

12 Claims, 17 Drawing Sheets

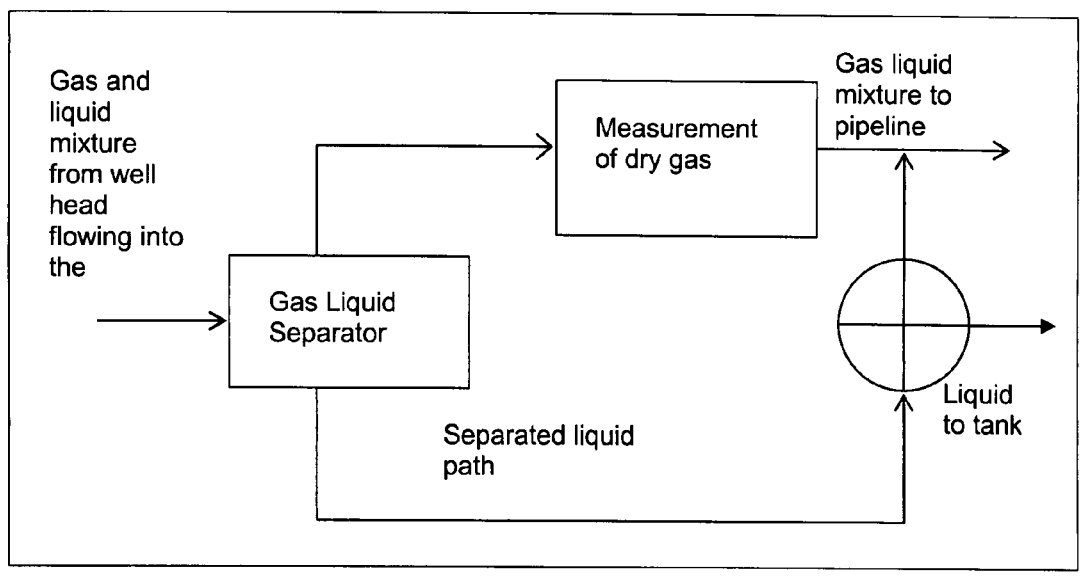
*Figure 1B: Measurement Facility Schematic*

*Figure 4: Qw/Qd vs LGR (while Ps and T held constant)*

Figure 5: Qw/Qd vs LGR (while dP and T help constant)

*Figure 6: 3 dimensional plot of fluid*

Figure 7: Data point correlations

Figure 8: Correction solution

Figure 9: Determination of the K value

Figure 10: Measurement correction process diagram

| Data # | Flow Pressure (Psig) | Differential Pressure (inH20) | Flow Temp. deg F | LGR Bbls/MMscf | Wet gas flow rate ($Q_w$) MMscf/day | Calculated dry gas flow rate ($Q_d$) MMscf/day | Reference Meter Flow Rate (Q) MMscf/day | % Difference Calculated value vs. Reference Meter |
|---|---|---|---|---|---|---|---|---|
| 1 | 895.63 | 10.57 | 60.71 | 6.04 | 2.49 | 2.42 | 2.44 | -0.94% |
| 2 | 889.44 | 11.5 | 57.47 | 20.11 | 2.59 | 2.42 | 2.43 | -0.37% |
| 3 | 913.14 | 12.88 | 59.45 | 49.76 | 2.78 | 2.39 | 2.39 | 0.06% |
| 4 | 914.01 | 17.2 | 68.13 | 100.02 | 3.17 | 2.44 | 2.48 | -1.61% |
| 5 | 898.81 | 43.59 | 64.55 | 4.75 | 5.02 | 4.85 | 4.86 | -0.25% |
| 6 | 893.25 | 48.96 | 63.97 | 21.13 | 5.31 | 4.86 | 4.83 | 0.72% |
| 7 | 888.61 | 57.56 | 64.53 | 50.86 | 5.73 | 4.85 | 4.81 | 0.77% |
| 8 | 875.68 | 71.61 | 65.58 | 99.03 | 6.33 | 4.8 | 4.79 | 0.17% |
| 9 | 894.15 | 65.33 | 63.21 | 5.05 | 6.14 | 5.88 | 5.95 | -1.23% |
| 10 | 891.61 | 73.91 | 62.98 | 20.15 | 6.52 | 5.95 | 5.92 | 0.45% |
| 11 | 888.84 | 89.11 | 63.6 | 50.42 | 7.14 | 6 | 5.92 | 1.36% |
| 12 | 874.91 | 114.27 | 68.04 | 97.69 | 7.95 | 6 | 5.87 | 2.14% |
| 13 | 889.26 | 97.95 | 66.91 | 4.9 | 7.44 | 7.09 | 7.22 | -1.83% |
| 14 | 884.78 | 113.08 | 66.55 | 20.76 | 7.98 | 7.22 | 7.21 | 0.15% |
| 15 | 882.52 | 137.24 | 68.04 | 51.1 | 8.75 | 7.3 | 7.18 | 1.65% |
| 16 | 877.55 | 177.31 | 70.63 | 102.12 | 9.87 | 7.33 | 7.18 | 2.02% |
| 17 | 396.39 | 99.02 | 71.79 | 5.3 | 4.85 | 4.62 | 4.69 | -1.52% |
| 18 | 394.57 | 112.7 | 69.45 | 20.61 | 5.17 | 4.71 | 4.69 | 0.52% |
| 19 | 392.55 | 139.07 | 75.3 | 50.66 | 5.67 | 4.79 | 4.69 | 2.19% |
| 20 | 387.57 | 178.03 | 81.49 | 101.93 | 6.32 | 4.77 | 4.66 | 2.40% |

Fig. 15

Raw data:

| Measured values from the multiphase flow metering facility - SwRI | | | | | | |
|---|---|---|---|---|---|---|
| Wet eTube Cd adjusted for Rd < 120,000 | | | | Mass Meter H2O inject rate | Orifice Meter Vol Gas Flow Rate | $Z_b$ |
| P, psig | dP, H2O | t, deg F | $Q_W$, MMscf/d[1] | Bbl/d | Q, MMscf/d | |
| 913.13721 | 12.88343 | 59.45154 | 2.77593 | 117.4165 | 2.35957 | 0.9980333 |

*Figure 16*

METHOD OF MEASURING GAS FLOW

BACKGROUND OF THE INVENTION

This invention relates to a method of measuring a gas flow. More particularly, but not by way of limitation, this invention relates to a method of measuring a dry gas flow from hydrocarbon wells.

According to the National Energy Board (NEB), Canada has about 53 trillion cubic feet (Tcf) of marketable gas supply. The Western Canada Sedimentary basin (WCSB) accounts for more than half. In addition, the magnitude of unconventional gas resources in place is estimated to be quite formidable. However, development of this natural resources require substantial capital expenditures and extensive drilling due mostly to the decline of the know reserve pool sizes and continued high demand for natural gas.

Even though the economic climate seems favourable, producers continue to face the predicament of developing these marginal pools within budgets and strict regulatory regime. According to the data found within the Alberta Energy and Utilities Board (EUB) publication titled: ST98-2006, production from the WCSB is not up to expectations, especially from unconventional sources.

Many producers have started to explore emerging operational paradigms and are open to adapting new technology devices. However, due to the realities of the labour markets, and the nature of these new technologies, typical well costs are still considered relative high in relation to the rate of returns of investment. These costs can range between 2 million to 2 hundred thousand depending on location and existing infrastructure.

Flow metering costs as a proportion of total revenue becomes significant as drill densities increase and the size of gas pools being developed get smaller. Yet, regulators continue to enforce strict measurement guidelines, effective well and reservoir management is dependent on accurate well flow data in order to design the production and processing infrastructure, control of hydrates, and the determination of optimal flow rates. Finally, accurate flow metering becomes a requirement to insure fair allocation of total production volumes when more than one party is using common pipelines, and processing facilities in joint venture relationship. One of the potential solutions for this economical dilemma which can be offered to producers is wet measurement of the flow stream, stated otherwise, metering of natural gas without separation of the liquids from the production stream.

Most typical gas wells with free liquid (water, condensate, and or a combination) in the flow stream, often require a gas-liquid separator to be installed upstream of the gas measurement device to maintain measurement accuracy within the prescribed limit established by the EUB and other similar government regulatory bodies.

SUMMARY OF THE INVENTION

A method of measuring a dry gas flow from hydrocarbon wells is disclosed. The hydrocarbon wells produce a stream which contains liquids and natural gas. The method comprises providing a differential flow measurement device (orifice), with the differential flow measurement device (orifice) having an elliptical throat, and wherein the differential flow measurement device (orifice) is located at a well site containing the hydrocarbon wells. The method further includes testing the stream for gas composition and physical characteristics. Additionally, the method comprises measuring a flowing temperature (T) of the stream, measuring a flowing pressure (Pf), and measuring a pressure differential (dP) in the differential flow measurement device (orifice). The method includes computing the liquid-gas ratio (LGR) of the stream, computing the wet gas flow rate (Qw) of the stream, computing a first dry gas flow rate (Qd1) utilizing a first model means, the first model means includes the following computation:

wet flow rate/dry flow rate=$Q$wet/$Q$dry=(term1)× (term 2)×(term 3)+(term 4)+(term5).

The method further comprises computing a second dry gas flow rate utilizing a graphical representation of a second model means and correcting the first dry gas flow rate (Qd1) and the second gas flow rate (Qd2) in order to obtain the dry gas flow rate (Qd).

In one preferred embodiment, the step of correcting the wet flow rate to the dry flow rate includes subtracting Qd1 from Qd2 to obtain a first delta factor and comparing the delta factor to an acceptable limit, and wherein the acceptable limit is between 0.3% and 1.5% of reading of a flow measurement instrument depending on the measurement requirements.

The step of correcting the wet flow rate to the dry flow rate further includes adjusting the estimated parameter, and wherein the estimated parameter includes density of the liquids and natural gas. Also, the step of correcting the wet flow rate to the dry flow rate includes inputting a new estimated parameter into the first model means, obtaining a revised Qd1, subtracting the Qd1 from Qd2 to obtain a second delta factor, and comparing the second delta factor to the acceptable limit, and wherein if the second delta factor is greater than the acceptable limit, then Qd is selected.

In one preferred embodiment, the method includes transmitting the data to a central location and obtaining royalty payments of the natural gas produced and/or the fair allocation of total production volume based on the derived Qd. The method may further comprise delivering the stream, including the produced gas and liquids, to a remote processing facility. At the processing facility, the liquids are separated from the produced gas and the hydrocarbon liquids and gas can be further processed.

An advantage of the present invention includes providing value to oil and gas operators. For instance, the method herein described can reduce capital cost through the elimination of separation equipment at the lease. The method can reduce operational cost due to the elimination of onsite separator, which in turn eliminates operational maintenance and repair on the separators. Another advantage is that an operator can increase production, and eventually ultimate recovery from the reservoirs, due to lower back pressure that is caused by the separator. Another advantage is that operators will reduce the safety risk by the elimination of pressure vessels at the lease site.

Another advantage is the iterative process to derive the dry gas flow rate is processed onsite utilizing processing means. Another advantage is that the data thus derived from the onsite processing means can then be transmitted to a central location. The transmission means may include terrestrial lines, hardwire, wireless, fibre optic, and satellite.

BRIEF DESCRIPTION OF THE DRAWINGS

FIG. 1B is a prior art schematic illustration of a measurement facility.

FIG. 15 is a data chart depicting measured and calculated values according to the present method.

FIG. 16 is a data chart depicting measured values from a multi-phase flow metering facility of the preferred embodiment for the example solution.

DETAILED DESCRIPTION OF THE PREFERRED EMBODIMENTS

Figure 1A:
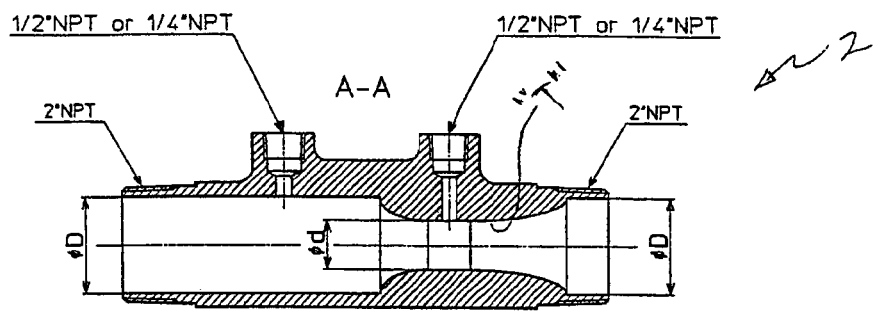
FIG. 1A is a prior art differential pressure-type flowmeter for measuring flow of fluids and gas.

Referring to FIG. 1A, a prior art differential pressure type flow meter (hereinafter "flow meter") for measuring flow of fluids and gas will now be described. This flow meter 2 is commercially available under the name eTube™ (Zedi claim trademark rights on the use of the term for oil and gas application in Canada). Applicant notes that the specification of the eTube™ is described in a technical data sheet entitled eTube™ Technical Data Sheet, SDR80A Series. The technical data sheet is incorporated herein by express reference.

FIG. 1B is a prior art schematic illustration of a measurement facility. As you can see, gas and liquid from the wellhead are flown into a separator 4. The liquids are separated via a separate path 6, with the liquids being directed to a tank 8. The gas from the gas liquid separator 4 is directed to the measurement system 10, which includes an differential flow measurement (orifice) meter. These prior art differential flow measurement device (orifice) type dry gas metering system are well known in the art. The liquid can be combined with the gas as shown at 12, and then placed into a pipeline. From there, the gas and liquids are delivered to a further processing facility for various purposes, including refining and distribution.

The flow meter 2, model SDR80A series, is Yamatake Corporation's (of Japan) differential pressure-type flow meter for measuring fluids under harsh conditions (see FIG. 1A). With its smooth shaped throat "T" (can this "T" be confused with temperature), it is designed to efficiently produce differential pressure, while creating a minimum permanent pressure loss. The throat "T" is shaped like an ellipse, which is where its original name "elliptical tube" was derived. Unlike other differential style meters, this unique design prevents the entrenched liquid in the flow stream from stagnating at the throat entrance, thereby enabling accurate measurement of the fluid flow. The flow meter is designed especially for measuring flow rate of natural dry gas or wet gas (in the future, there are plans to measure steam and liquids).

The American Gas Association (AGA) report 3, part 1 standard stipulates that the metered fluid stream must be in a single phase. A white paper commissioned by API simply concluded, "Wet gas is the presence of liquids in the gas stream under surface flow conditions and pressures". The number of wells producing raw natural gas in single phase is a rarity. Most wells within the Western Canadian Sedimentary Basin (WCSB) have gas water ratios of 2 millilitres (mL) per standard meter cubed ($Sm^3$) to 560 $mL/Sm^3$, depending on the flow pressure and temperature. Therefore, it can be concluded that wet metering occurs whenever production gas is metered without prior separation of well effluents. Typically, wells with gas water ratios between 2 $mL/Sm^3$ and 10 $mL/Sm^3$ under most flow conditions are considered as flowing dry gas and usually do not require separation prior to metering.

Figure 2:
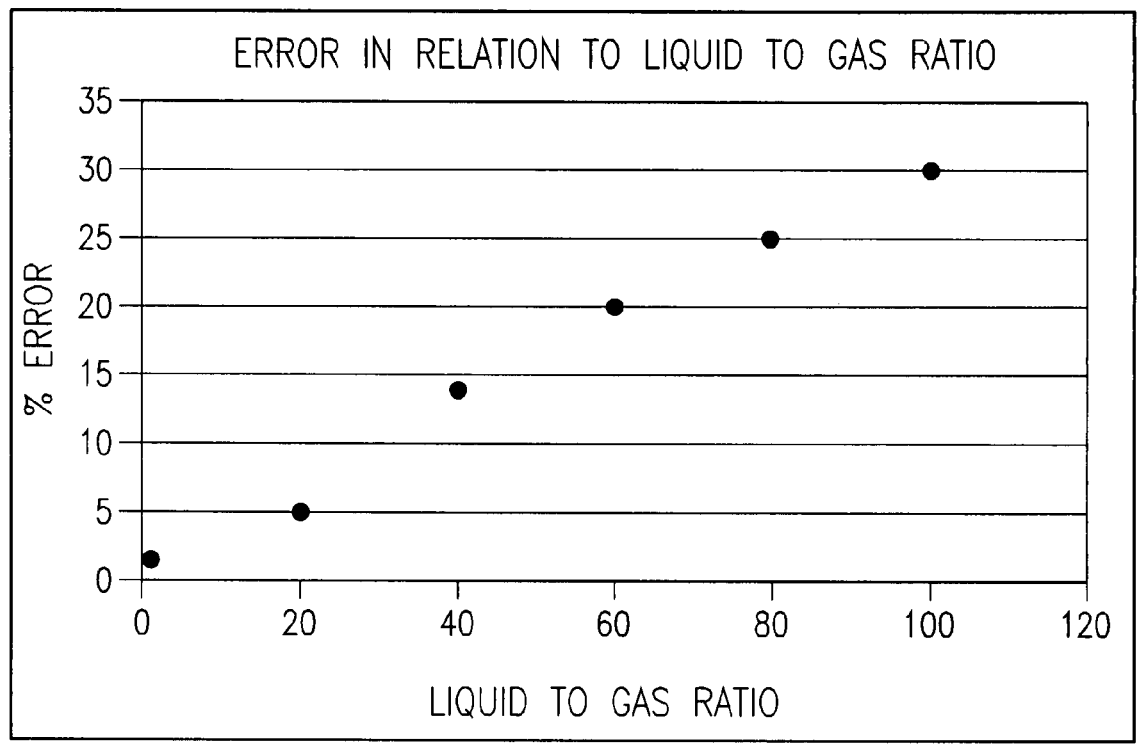
FIG. 2 is a graphical representation of the LGR (liquid-gas ratio) error relationship.

Liquids entrenched within the gas stream (wet gas streams) will affect the performance of gas flow measurement. These measurement errors will be in direct relation to the quantity of liquids present in the flow stream. For the purpose of this document, the quantity of liquid to gas is expressed in terms of a ratio, and referred to as the liquid to gas ratio (LGR). The magnitude of the measurement error will increase proportionally to the percent of liquid in relation to the total flow volume. FIG. 2 is a graphical representation of the liquid-gas ratio (LGR) error relationship.

As used herein, the liquid to gas ratio (LGR) is the ratio of gas volume flow rate and the total liquid volume flow rate. Both volume flow rates should be converted to the same pressure and temperature (generally at the standard conditions). Usually, LGR is expressed in terms of volume per volume, e.g., l/m3 (metric system) or bbl/MMscf (imperial system of measurement).

The eTube capabilities have been characterized through empirical tests at Southwest Research Institute and its ability has been proven to be suited for reliable wet gas measurement within identifiable levels of uncertainty, and may provide accurate and reliable volumetric flow rate data for royalty transfer, production allocation, and effective well management.

Figure 3:
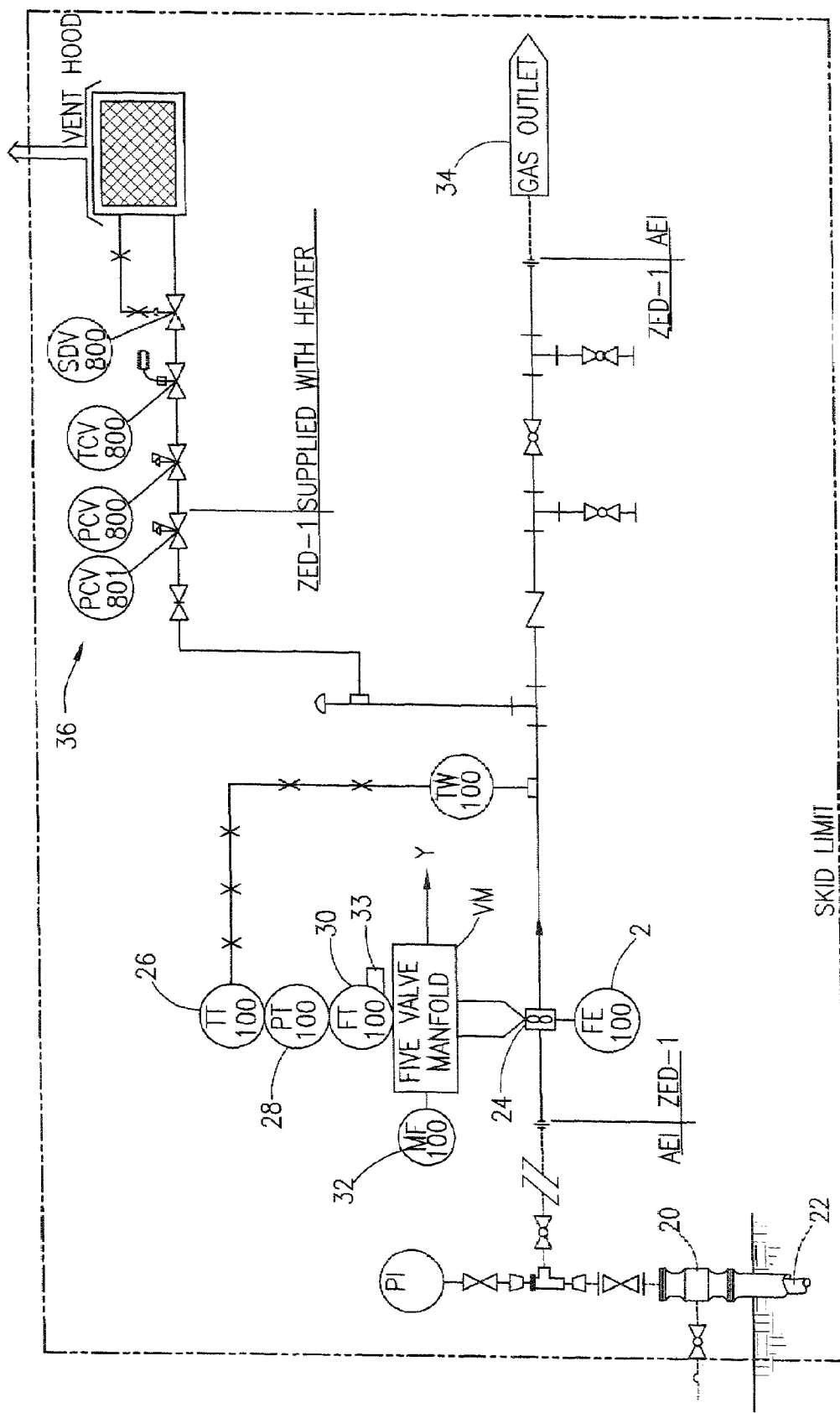
FIG. 3 is a schematic of a wet gas measurement facility of the present disclosure.

FIG. 3 is a schematic of a wet gas measurement facility of the present disclosure. As seen, there is a well head 20, wherein the well head is communicated to a casing string 22 and wherein the casing string is communicated with a subterranean hydrocarbon reservoir, as is well understood by those of ordinary skill in the art. From the well head, production from the reservoir proceeds through the metering station 24, and wherein the metering station 24 will have the flow meter 2 previously described (see FIG. 1A). At this point in the process, the stream from the casing 22, through the well head 20, and into the metering station 24 will be metered according to the present disclosure. The metering station 24 includes a temperature transmitter 26, a pressure transmitter 28 and a flow transmitter 30 (differential pressure transmitter), as well as a mass transmitter 32 (not in all cases). A processing means 33 (this is pointing to the tubing on the figure) for processing the accumulated data (the data may be processed on the Zedi server and later pushed back to the device) as per the teaching of this present disclosure is also included. The processing means 33 will have electrical circuit means for performing the processing. A valve manifold is operatively attached to the metering station 24 for regulating control of the stream. The actual correction process for the dry gas flow rate is processed at the metering station 24 via processing means 33. FIG. 3 also depicts the gas outlet 34. It should be noted that FIG. 3 also shows a safety bleed means seen generally at 36 which would include valves and a heater. The process may include correcting the readings with the processing means 33 so the dry gas flow rate can be known, and then transmitting this data to another location so various information can be calculated and disseminated. For instance, once the dry gas flow rate is known, all transfer payments can be authorized, point of sale contracts can be completed, as well as other processing data which requires the dry gas flow rate for fair allocation of the total production volume.

The current theoretical model that describes various orifice flow measurements are rather weak in predicting the flow conditions for many orifice's mechanical configurations. To determine the influence of an orifice's mechanical configuration to flow regime, often an empirical approach is employed to gather data and to delineate flow conditions using an additional numerical model to compensate for the deficiency in the theoretical model. The following describes new and useful methods of accomplishing wet metering capability.

The flow meter 2 has a unique profile and produces a set of data for various flow conditions. This disclosure shows two empirical models. This disclosure describes the iterative process used between the two empirical models to best derive the effective dry gas flow rate from the measured wet gas flow rate. The two empirical models used for the purpose of the iteration are described below.

A. Empirical First Model Means (Wet to Dry Gas Equation)

The following equation was developed for determining the ratio of wet gas to dry gas, Qw/Qd, when liquid is flowing through an eTube element with the gas. The equation has 5 terms, of which 3 were derived through measurement of the wet flow stream, and 2 are calculated by way of constants and the knowledge of the gas composition and fluid mass. A sixth term is added to compensated for temperature and pressure as required. In order to calculate the last 2 terms, a well test must be performed in order to evaluate the gas composition and the ratio of liquid in relation to the gas flow.

The constants and conversion factors used for calculating the mass values of the fluid flow through the metering device are published in the gas processors suppliers association engineering (GPSA) data book (2004 edition) or have been stated within the American Gas Association (AGA) standard.

For this illustration, the flow rate must be in a volumetric terms and the units used must be consistent through the calculation. Care must be taken when applying conversation factors. Some conversion factors are pressure/temperature dependent.

$$\frac{Q_{Wet}}{Q_{Dry}} = (\text{Term 1}) \times (\text{Term 2}) \times (\text{Term 3}) + (\text{Term 4}) + (\text{Term 5})$$

Term 1:
This term is used to correlate the volumetric flow rates of the fluid in terms of their mass. The liquid component must be separated from the gas component by way of a well test. The mass of gas is calculated by knowing the composition of the gas and the molecular mass of each component of the gas.

$$\left(\chi \times \left(\frac{Ml}{Mg}\right)^2 + \alpha \times \left(\frac{Ml}{Mg}\right) + \varepsilon\right)$$

Term 2:
This term is used to correlate the differential pressure. The dP value is derived by way of measurement of the flow stream.

$$x(\gamma + \partial P^\phi \div \eta)$$

Term 3:
This term is used to correlate the static pressure. This value is derived by way of measurement of the flow stream.

$$\times \left(\gamma + \left(P \times \left(\frac{Ml}{Mg}\right)\right)^t \div 100 \times \eta\right)$$

Term 4+Term 5:
This term is used to correlate the beta ratio of the flow meter. The value is derived by way of measurement of the pipe diameter D and the throat diameter d. Beta is d/D.

$$+\left(\chi \times \text{LOG}\left(\left(\frac{Ml}{Mg}\right)^\kappa\right)\right) + (\lambda \times \text{LOG}(\beta \times \mu))$$

Where:
Qw=wet gas flow rate calculated on the basis of the gas properties while a liquid is flowing with the gas through the eTube element. This calculation is usually performed by EFM using the latest measurement standards as specified by a governing body.
Qd=the dry gas flowing with the liquid through the eTube element. This value is calculated by way of the eTube wet gas correlation.
Ml=Mass of liquid through the eTube flow element. This value is calculated by first determining the liquid to gas ratio (LGR).
Mg=Mass of gas through the eTube flow element. This value is calculated by first determining the LGR, and the gas composition.
Ml/Mg=the ratio of the mass of liquid to the mass of gas in the wet flow stream.
∂P=the differential pressure of the eTube flow element. This value is measured usually by pressure transmitters.
P=Static pressure at eTube. This value is usually measured by way of pressure transmitters.
β=actual beta ratio of Wet eTube element. This value is the ratio of the throat diameter to the pipe diameter.
χ=Correlating coefficient—low flow rates;
a=Correlating coefficient—high flow rates;
e=Flow rate coefficient;
γ=Pressure coefficient;
θ=Differential pressure adjustment correlating coefficient;
ή=Differential pressure correlating coefficient;
t=Static pressure adjustment correlating coefficient;
κ=Beta ratio adjustment correlating coefficient;
λ=Beta ratio coefficient;
μ=Beta ratio range coefficient;

B. Empirical Second Model Means

This is an approach that is used for a unique set of data that have confirmed relationship yet theory fails to describe the details of data relationship. The confirmed relationship is further supported by the fact that data are collected from a set of instruments that measures process variables from a controlled environment.

When a set of data is acquired from eTube and test apparatus, this test data maps over the dimensional space of Ps (measured static pressure), dP (measured differentia pressure across eTube), T (measured stream temperature), Qw (measure flow rate based on gas calculation while dry gas is injected with water), and Qd (measure flow rate based on while gas is free from water.)

$$\therefore \frac{Q_w}{Q_d} = f(Ps, dP, T, LGR).$$ Equation 10

Figure 4:
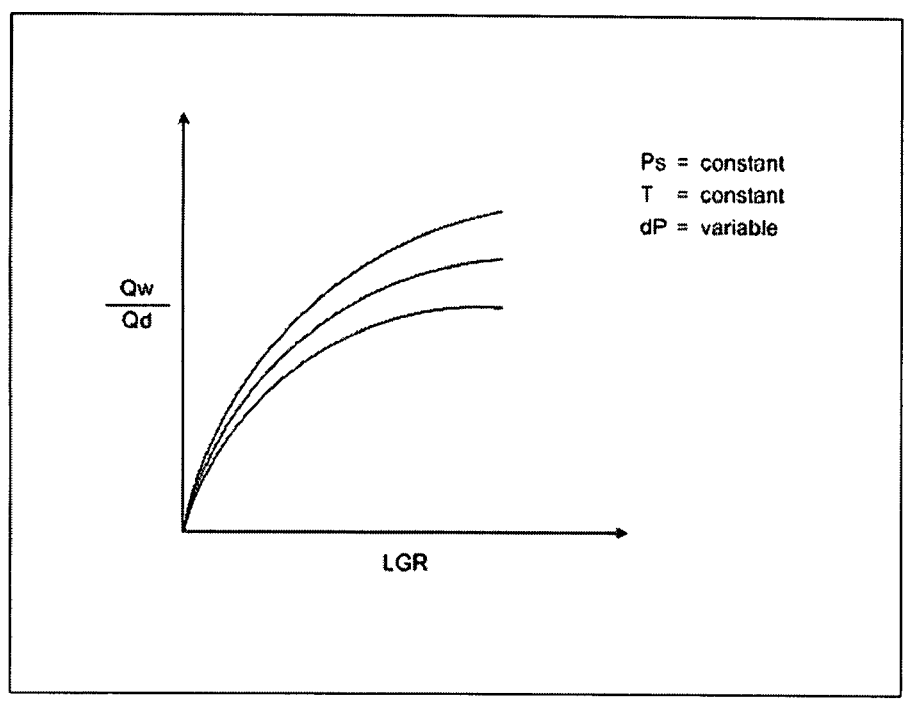
FIG. 4 is a graphical representation of the Qw/Qd versus LGR while the Pf and the T is held constant.
Figure 5:
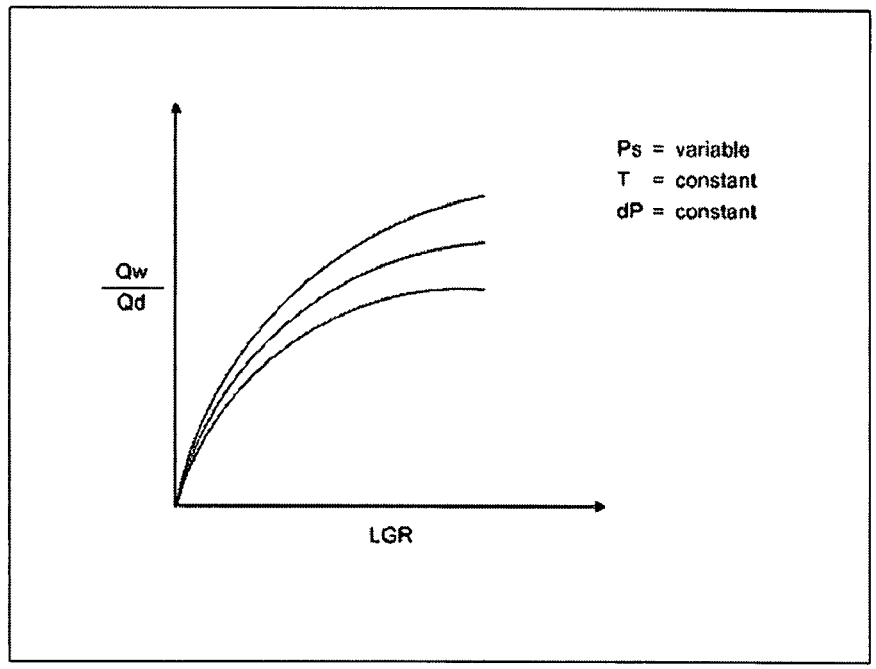
FIG. 5 is a graphical representation of the Qw/Qd versus LGR while the dP and T are held constant.

The typical graphical presentation of data set will look like FIG. 4 which is a graphical representation and FIG. 5 which is a graphical representation.

Figure 6:
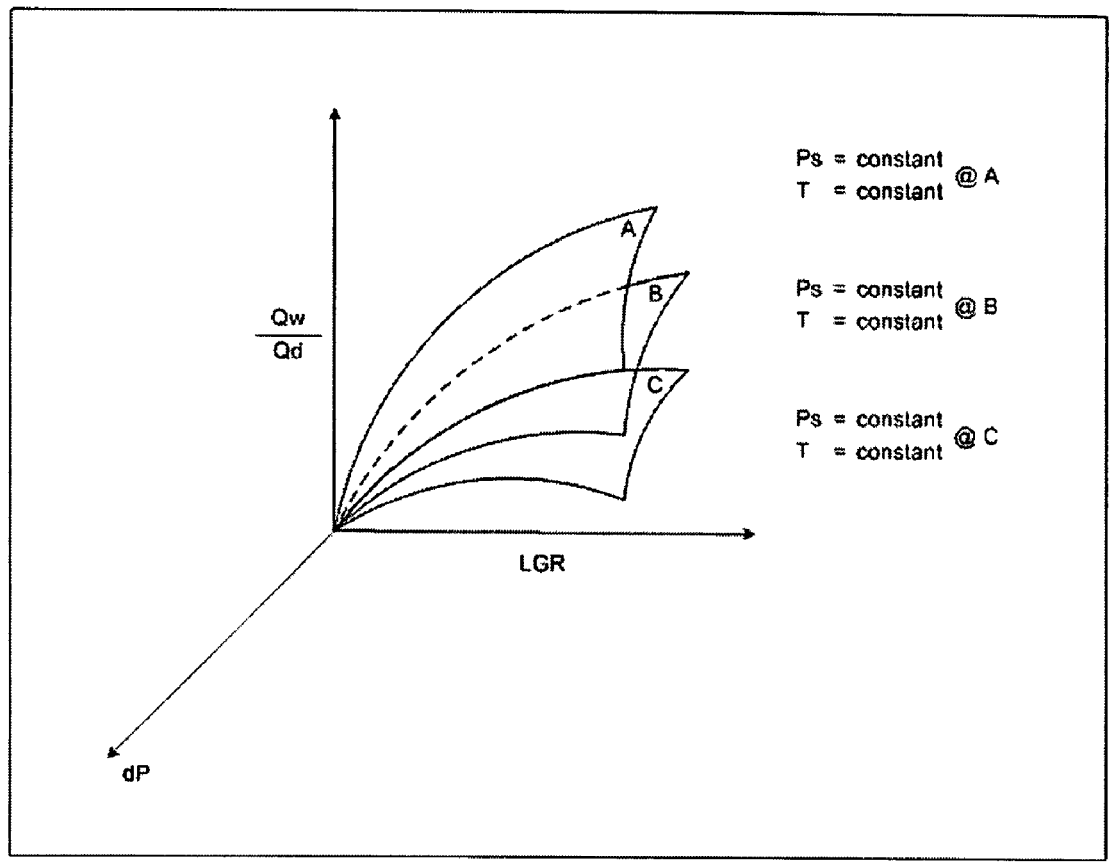
FIG. 6 is a graphical representation of a three-dimensional plot of fluid.
Figure 7:
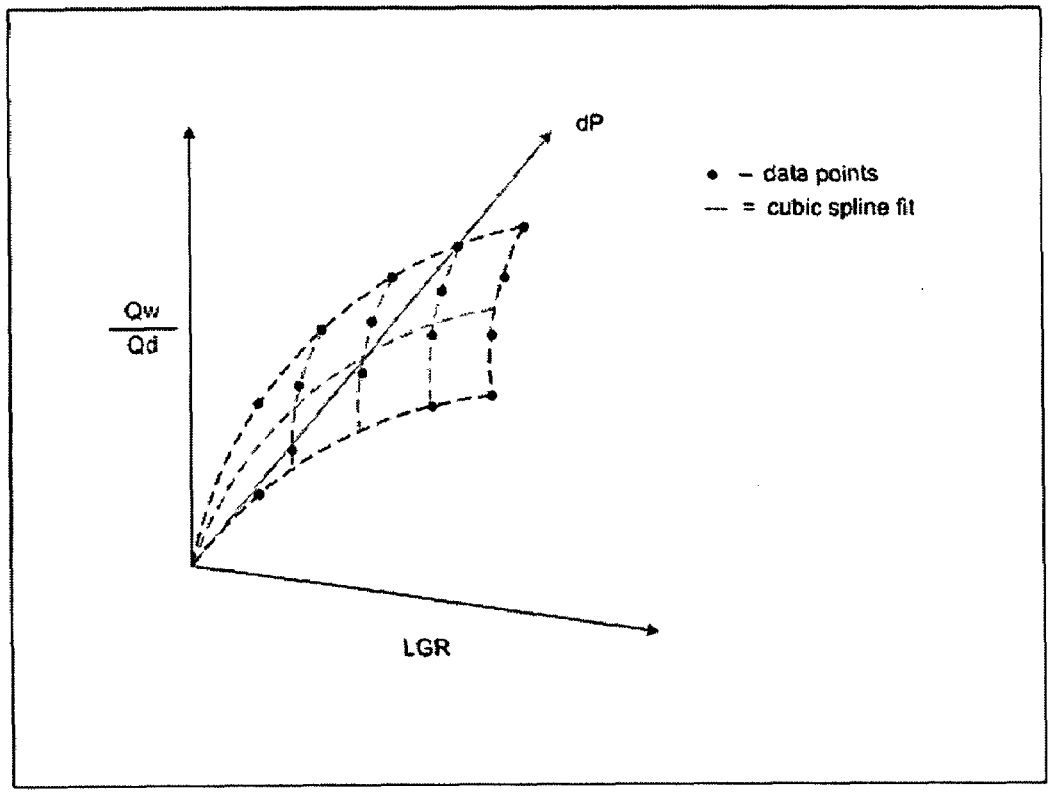
FIG. 7 is a graphical representation of data point correlations taken from FIG. 6.

Thus more comprehensive graphical presentation of the gas flow measurement can be mapped. FIG. 6 is a graphical three-dimensional plot of fluid. FIG. 7 is a graphical three dimensional plot of data point correlations.

The data point can be connected with the cubic spline method shown in FIG. 7.

Figure 8:
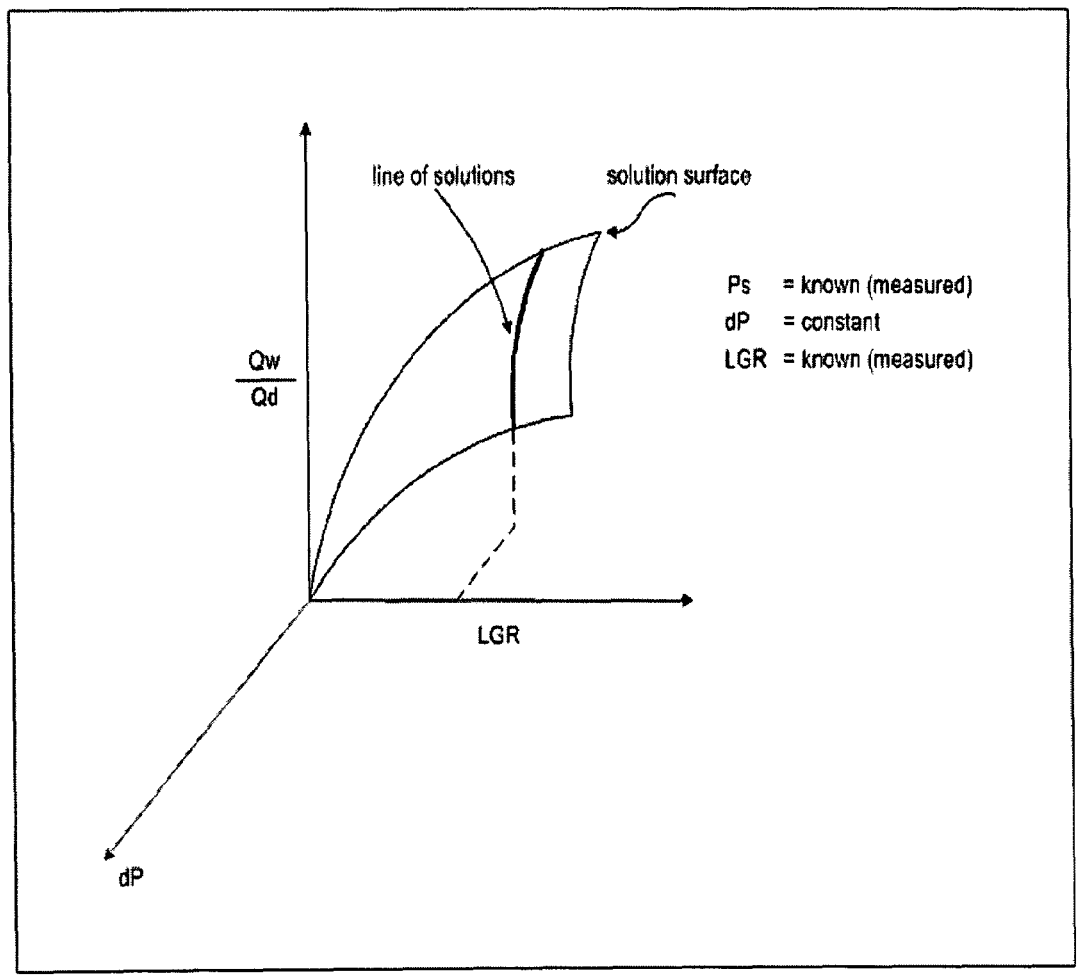
FIG. 8 is a graphical representation of the line of solutions according to the correction process of the present disclosure.

For a given measurement: Ps, dP, T, Qw, the effective dry gas flow rate Qd can graphically be represented. Therefore, for a given Ps, we can determine a 3 dimensional solution surface that can be determined as shown in FIG. 8, which is a graphical representation of the correction solution.

Finally, with the LGR data, we can identify the line of solution in the solution surface. For a given dP, we can determine a calculated single data point in the line of solution.

Figure 9:
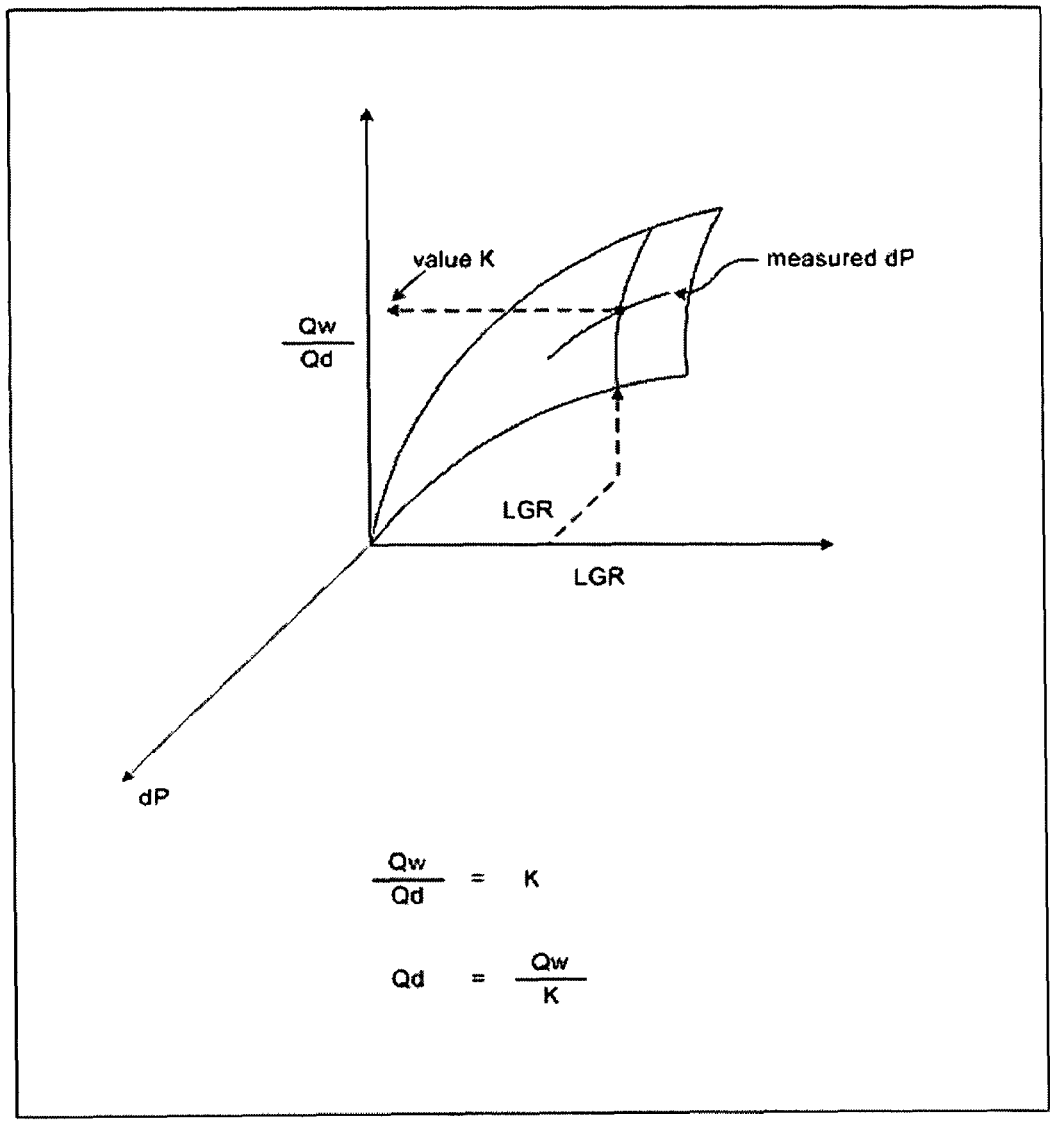
FIG. 9 is a graphical representation of the determination of the K value taken from the data of FIG. 8.

FIG. 9 is a graphical representation of deviation of the K value. Once the value of K is known, the effective dry gas value can be calculated by use of the following equation: Qd=Qw/(calculated results K).

Research conducted at the Southwest Research Institute (SwRI) has led to greater understanding of wet gas measurement capabilities of the eTube technology. One of the direct results of this research has been the development of the empirical models which enables the determination of the effective dry gas rate on the basis of the liquid to gas ratio. The wet gas correction parameters are unique to the flow meter. Therefore, the parameters used to correct the effects of wet gas are based on the flow meter characteristics observed during the research phase.

Gas flows not containing any liquids under actual operating conditions, however with further processing (e.g., pressure and temperature changes), liquids again might fall out.

Figure 10:
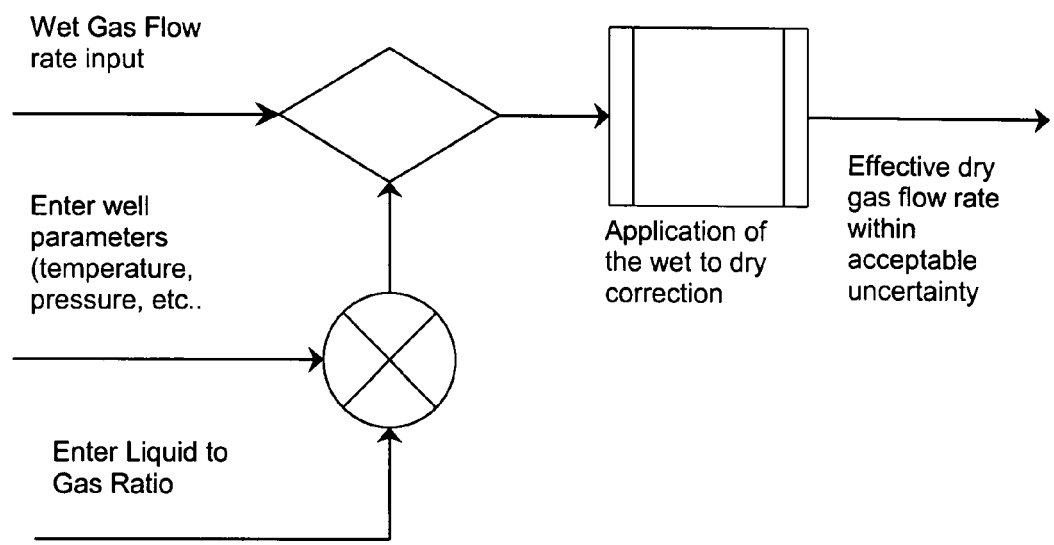
FIG. 10 is a flow chart diagram of the measurement correction process of the present disclosure.

Referring now to FIG. 10, a flow chart diagram of the measurement correction process is illustrated. Empirical process first model means has the strength to manage the variation in physical parameters such as density variations etc. However, it also has a weakness in the magnitude of error between calculated value and measured value. Empirical process second model means has the strength in maintaining minimal error between the calculated values and measured value; however, second model means at times is rigid in certain cases and has little latitude for taking into account variation in some physical flow parameters.

Thus the process is designed to iterate between the two models to come up with best estimate between the two. The following shows the flow chart of estimation and decision process.

Figure 11:
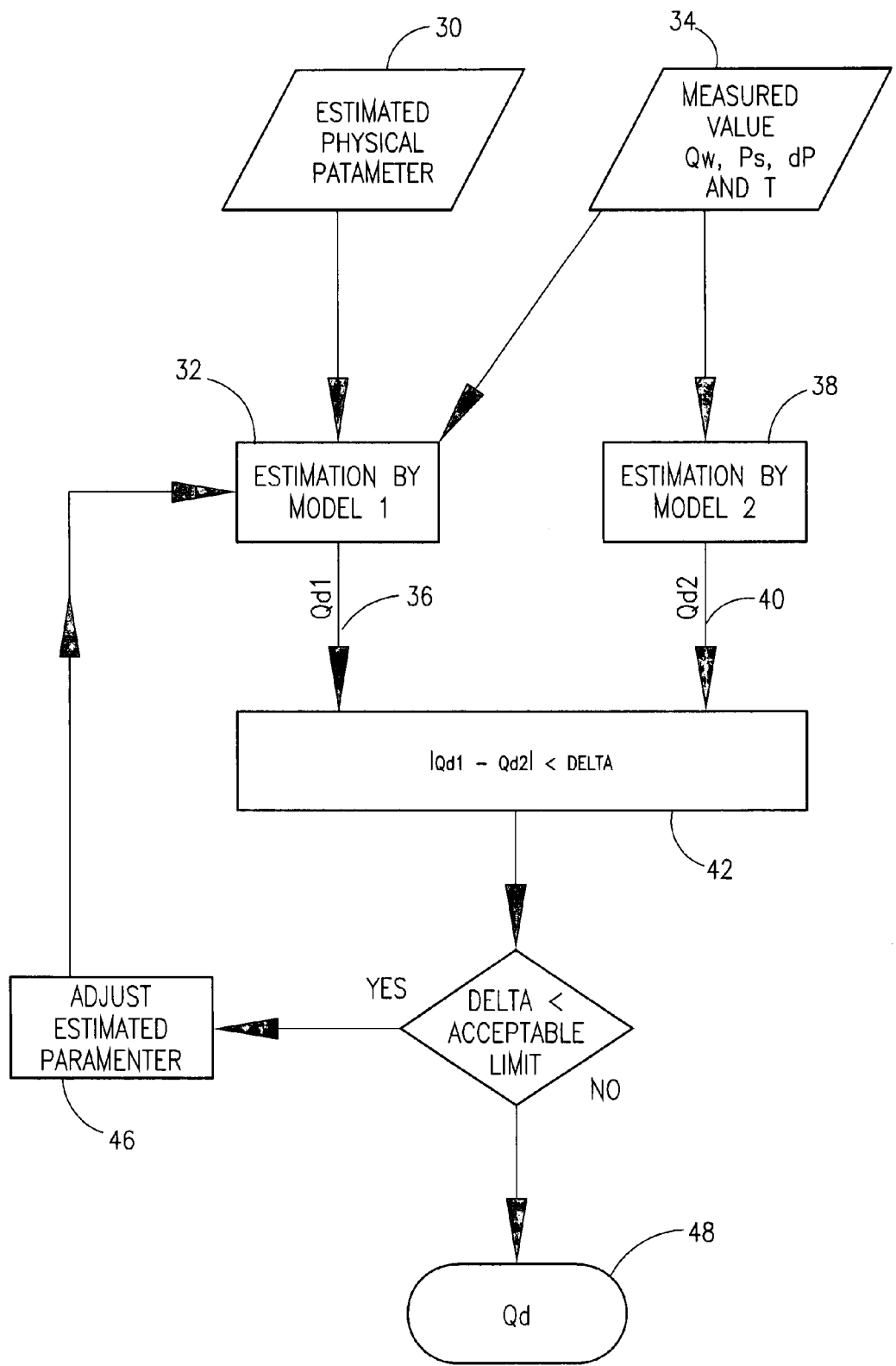
FIG. 11 is a flow chart diagram of the correction process of the present disclosure.

FIG. 11 is a flow chart diagram with the correction process of the present disclosure. As you can see in FIG. 11, estimated physical perimeters 30 are input into first model means 32. Also, input into first model means for estimation, are the measured values of the flow stream, of the static pressure, of the differential pressure, and the temperature (see 34). From there, first model means computes a first dry flow rate (Qd1 36). Also, the measured values seen in block 34 are inputted into model 2 for estimation (see block 38). The second model means, is previously described, and computes the drive flow rate (Qd2 40). Next, the process includes subtracting Qd1 from Qd2 to give the Delta element 42. Next, the Delta is compared to the acceptable limit. The acceptable limit is normally set to be equal to 0.3% to 1.5% of reading depending on the measurement uncertainty requirements. If the Delta is less than the acceptable limit, then the process includes adjusting the estimated perimeters. It should be noted that the estimated physical perimeters are generally density 46. The information from the process of step 46 is inputted again for estimation into first model means 32. This process loops such that a Qd1 is produced, and Qd1 minus Qd2 is again compared for the Delta element. Again, as seen in FIG. 11, this Delta is compared to the acceptable limit. If the acceptable limit is greater than the Delta, then the Qd is derived as seen in block 48.

Where:
Qw Measured wet gas volumetric flow rate.
Qd Estimated dry gas volumetric flow rate.
P Measured Static Pressure
dP Measured Differential Pressure Across eTube.
Tf Measured Gas Flow Stream Temperature.
Qd1 Estimated Dry Gas Volumetric Flow by Model 1.
Qd2 Estimated Dry Gas Volumetric Flow by Model 2
Delta Difference between Qd1 and Qd2.

Figure 12:
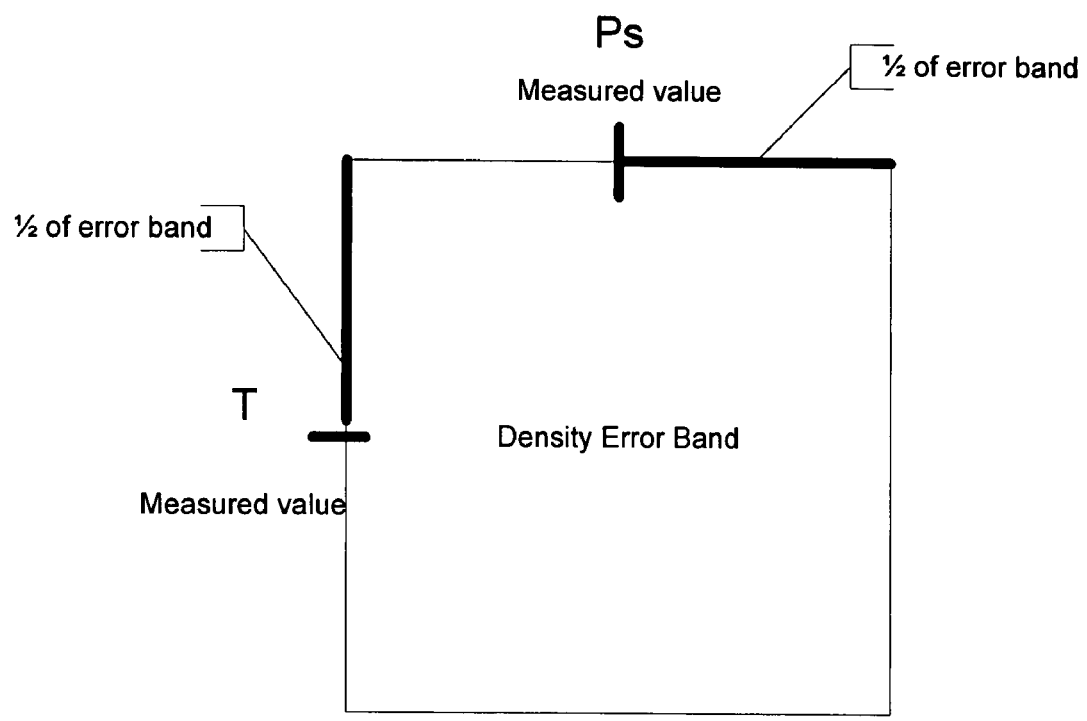
FIG. 12 is a graphical representation of the density error band of measured static pressure versus temperature.
Figure 13:
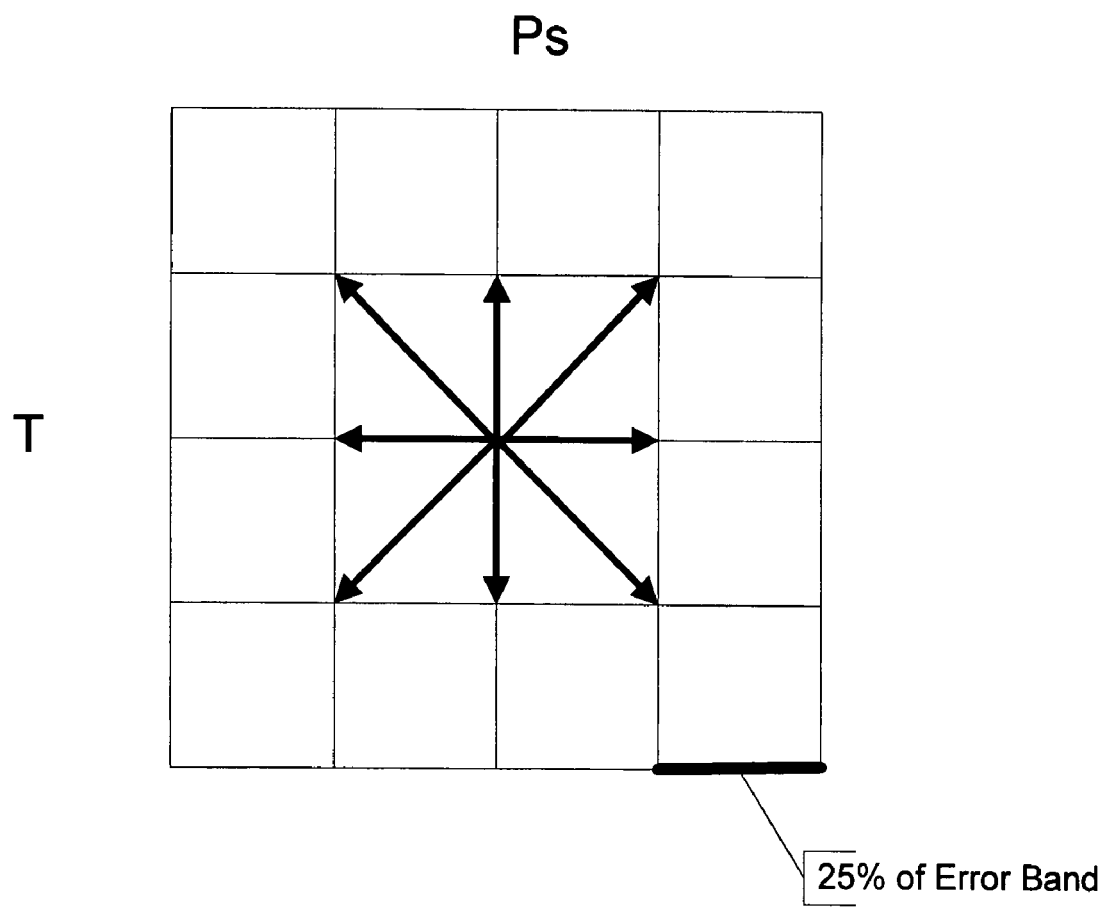
FIG. 13 is an iterative step of the present method depicted in FIG. 12.
Figure 14:
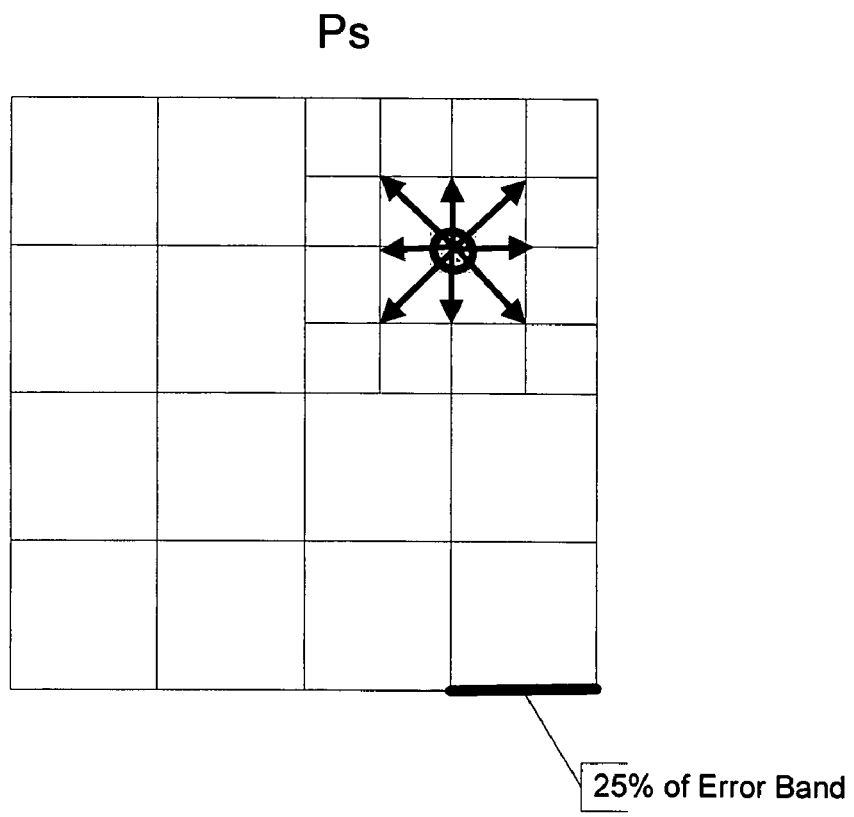
FIG. 14 is an iterative step of the present method depicted in FIG. 13.

Referring generally to FIGS. 12, 13, and 14, the adjustment process will now be described. FIG. 12 is a graphical representation of the density error band of measured pressure (static) versus temperature. FIG. 13 is an iterative step of the graphical representative seen in FIG. 12. FIG. 14 is an iterative step of the graphical representation seen in FIG. 13. The adjustment process of physical parameters happens as follows:

There are physical parameters that can affect the estimation; namely, the density of water and gas. It is reasonable to assume that the density of methane gas based on static pressure and temperature can make larger contribution to the Model 1 estimates.

Since the density of water and gas has been show as:
$\rho$ water=function of (Ps, T)
$\rho$ gas=function of (Ps, T)

The density is a derived value from static pressure and temperature measurement, it is reasonable to expect measurement error. By assuming:
$\rho$ gas$\ll\rho$ water $\rho$ gas can vary within the measurement error band.
The measured value will specify the middle of the square for the density error band.

To find the local minimum deviation of the delta, the program can be set to deviate the density value by 25% of error band as shown below; reference is made to FIG. 12.

If the local minimum is found out of 9 new estimates, say northeast corner then the whole local minimum process can be repeated as shown below until the delta meets the acceptable limits. Reference is made to FIG. 14.

This iterative process ensures that the estimate meets both objective functions of 2 completely separate empirical models.

Data

FIG. 15 is a data chart depicting measured and calculated values according to the present method. FIG. 16 is a data chart depicting measured values from a multi-phase flow metering facility for the example solution. Reference is made to both FIG. 15 and FIG. 16 for the following discussion. The behaviour of gas and liquid in a flowing pipe will exhibit varied flow characteristics depending on the following parameters: gas flow pressure, gas flow rate, and liquid content. These gas and liquid interactions are commonly referred to as flow regimes or flow patterns. The empirical first and second model means can be used to predict the performance of the eTube based on the flow regime present. A set of sample data is presented in FIG. 15 and FIG. 16 which was acquired during testing at a certified laboratory with confirmed accuracy for a given eTube:

Example Solution

Note for Sample Calculation:
1. Gas composition is assumed to be, methane. Usually a sample of gas is analyzed under laboratory conditions in order to determine all the constituent components, both hydrocarbon and associated impurities.
2. The liquid is determined to be water.
3. Atmospheric pressure is assumed to be 14.696 psi. This value will be site dependent, and is determined by the elevation.
4. At base conditions:
   a. Water mass is 999.19 kg/m³
   numbers are not needed they are for unit conversion only
5. Base conditions Canada:
   a. Temperature=15° C. (59° F.)
   b. Pressure=101.325 kPa (14.696 psi)
6. Base conditions US:
   a. Temperature=60° F.
   b. Pressure=14.73 psi Step 1: Calculate the Liquid to Gas Ratio Values from Table 1:
1. Water injection rate: 117.4165 Bbl/day
2. Gas flow rate: 2.35957 MMscf/day LGR (in Bbl/MMscf)=Water injection rate in Bbl/Day Gas flow rate in MMscf/Day $$\therefore LGR = 117.4165^{Bbl/Day} \div 2.35957^{MMscf/Day} = 49.76182^{Bbl/MMscf}$$

Step 2: Calculate the Mass of Water Ml

Mass of Water Per Barrel:

$$H_2O \text{ lb/Bbl} = \frac{1 \text{ lb}}{0.4536 \text{ kg}} \times \frac{0.1590 \text{ m}^3}{Bbl} \times \frac{999.19 \text{ kg}}{1 \text{ m}^3}$$
$$= 350.25 \text{ lb/Bbl}$$

$\therefore$ Mass of water per MMscf:

$$Ml = 49.76182^{Bbls/MMscf} \times 350.25^{lb/Bbl} = 17,429.0775^{lb/Bbl}$$

The liquid rate determined during the well test may be at pressures and temperature other then base conditions, a term will be added to the equation for density adjustment according to the test pressure and temperature.

Step 3: Calculate the Mass of Gas Mg

Constants:
1. Gas constant=10.73164 psia ft³/lbmol-R;
2. Base pressure U.S.=14.73 psia;
3. Compressibility Factor $Z_b$ (base conditions)=0.9980333 (calculated value);
4. Temperature Fahrenheit to Rankin: ° R=° F.+459.67
5. 60° F.=519.67;
6. Molecular weight of methane=16.043 lb/mol Volume of 1 lb/mol of C1 gas at base conditions U.S. (14.73 psia & 60° F.) = $0.9980333 \times 10.73164$ psia ft³/lbmol°R $\times$ $$519.67°R \times 1/14.73 \text{ psia}$$
$$= 377.864 \text{ scf/lbmol}$$

$\therefore$ 1 MMscf $\times$ 1/377.864 scf/lbmol = 2646.455 lbmol $\therefore$ Mass of 1MMscf of Methane = $2646.455 \times 16.043$ = 42457.07 lb $$\therefore \frac{Ml}{Mg} = \frac{17,429.0775}{42457.07} = 0.41051$$

Step 4: Calculate $Q_d$

The numerical values necessary for calculating the effective dry gas rate is now available. These values can now be inserted into the empirical models to determine $Q_d$.

$$\therefore \frac{Q_w}{Q_d} = 1.1007 \times 1.02446 \times 1.02958 + (-0.001933) + 0.00168025$$
$$= 1.160725$$

$$\therefore Q_d = \frac{Q_w}{1.160725} = \frac{2.77593}{1.160725} = 2.392 \text{ MMscf/day}$$

eTube Dry=2.388MMscf/day

Difference between the measured eTube dry value and calculated value is 0.15%.

While the particular invention as herein shown and disclosed in detail is fully capable of obtaining the objects and providing the advantages herein above stated, it is to be understood that this disclosure is merely illustrative of the presently preferred embodiments of the invention and that no limitations are intended other than as described in the claims, and any equivalents thereof.

We claim:

1. A method of measuring a dry gas flow from hydrocarbon wells, said hydrocarbon wells producing liquids and natural gas so that a stream is produced, the method comprising the steps of:
   (a) providing a differential flow measurement device (orifice), said differential flow measurement device (orifice) having an elliptical throat, wherein said differential flow measurement device (orifice) is located at a well site containing the hydrocarbon wells;
   (b) testing the stream for gas composition and physical characteristics;
   (c) measuring a flowing temperature of the hydrocarbon stream;
   (d) measuring a flowing pressure;
   (e) measuring a pressure differential in said differential flow measurement device (orifice);
   (f) computing the liquid-gas ratio (LGR) of the stream;
   (g) computing the wet gas flow rate of the stream;
   (h) computing a first dry gas flow rate (Qd1) utilizing a first model means, the first model means includes the following computation: wet flow rate/dry flow rate=Qwet/Qdry=(term1)×(term2)×(term3)+(term4)+(term5);
(i) computing a second dry gas flow rate (Qd2) utilizing a graphical representation of a second model means; and
(j) correcting the first dry gas flow rate (Qd1) and the second dry gas flow rate (Qd2) to obtain the dry gas flow rate (Qd):
wherein step (j) includes subtracting Qd1 from Qd2 to obtain a first delta factor and comparing the delta factor to an acceptable limit, said acceptable limit being between 0.3% and 1.5% full scale (FS) of a flow measurement instrument depending on the measurement requirements; and
wherein steps (a) through (j) are performed before said hydrocarbon stream undergoes a separation to separate said liquids from said produced gas in said stream.

2. The method of claim 1 wherein step (j) further includes adjusting an estimated parameter, wherein the estimated parameter includes density of the liquids and natural gas.

3. The method of claim 2 wherein step (j) further includes inputting a new estimated parameter into the first model means; obtaining a revised Qd1; subtracting the revised Qd1 from Qd2 to obtain a second delta factor; and comparing the second delta factor to the acceptable limit, wherein if the second delta factor is less than the acceptable limit, then Qd is selected.

4. The method of claim 3 further comprising the steps of:
(k) transmitting the data to a central location; and
(l) obtaining payment of the natural gas produced based on Qd.

5. The method of claim 4 further comprising the step of:
(m) delivering the stream, including the produced gas and liquids, to a remote processing facility.

6. The method of claim 5 further comprising the step of:
(n) separating the liquids from the produced gas at the remote processing facility.

7. A method of measuring a dry gas flow from a stream, said stream containing natural gas and liquids from hydrocarbon wells, the method comprising the steps of:
(a) estimating a physical parameter of the stream;
(b) measuring wet gas flow (Qw), static pressure (Ps), differential pressure (dP), liquid-gas ratio (LGR) and temperature (T);
(c) computing a first dry gas flow rate (Qd1) utilizing a first model means;
(d) computing a graphical representation of Qw/Qd, LGR and dP utilizing a second model means;
(e) obtaining a second dry gas flow rate (Qd2) from the graphical representation of the second model means; and
(f) correcting the first dry gas flow rate (Qd1) and the second dry gas flow rate (Qd2) to obtain the dry gas flow rate (Qd);
wherein step (f) includes subtracting Qd1 from Qd2 to obtain a first delta factor, and comparing the delta factor to an acceptable limit, said acceptable limit being between 0.3% and 1.5 % of a reading of a flow measurement instrument depending on the measurement requirements; and
wherein steps (a) through (f) are performed before said hydrocarbon stream undergoes a separation to separate said liquids and said produced gas in said stream.

8. The method of claim 7 wherein step (f) further includes adjusting the estimated parameter, wherein the estimated parameter includes the density of the gas and liquid phases.

9. The method of claim 8 wherein step (f) further includes inputting a new estimated parameter into the first model means; subtracting Qd1 from Qd2 to obtain a second delta factor; and comparing the second delta factor to the acceptable limit, wherein said comparing step is repeated until the second delta factor is less than the acceptable limit.

10. The method of claim 9 further comprising the steps of:
(g) processing the data at the well site;
(h) wirelessly transmitting the data to a central location; and
(i) preparing royalty payments of the produced natural gas produced based on Qd.

11. The method of claim 10 further comprising the step of:
(j) delivering the stream, including the produced gas and liquids, to a refinery.

12. The method of claim 11 further comprising the step of:
(k) separating the liquids from the produced gas at the refinery.

* * * * *